(12) United States Patent
Gupta et al.

(10) Patent No.: US 11,303,618 B2
(45) Date of Patent: Apr. 12, 2022

(54) ENCRYPTION MANAGEMENT

(71) Applicant: International Business Machines Corporation, Armonk, NY (US)

(72) Inventors: Lokesh Mohan Gupta, Tucson, AZ (US); Matthew G. Borlick, Tucson, AZ (US); Mark Elliott Hack, Austin, TX (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/792,341

(22) Filed: Feb. 17, 2020

(65) Prior Publication Data

US 2021/0258290 A1    Aug. 19, 2021

(51) Int. Cl.
*H04L 9/40* (2022.01)
*H04L 29/06* (2006.01)
*H04L 9/14* (2006.01)

(52) U.S. Cl.
CPC ............ *H04L 63/0478* (2013.01); *H04L 9/14* (2013.01); *H04L 63/1441* (2013.01)

(58) Field of Classification Search
CPC ... H04L 63/0478; H04L 63/1441; H04L 9/14; H04L 9/0891; H04L 9/0894; H04L 63/0428; H04L 63/20; H04L 63/0485
See application file for complete search history.

(56) References Cited

U.S. PATENT DOCUMENTS

| 4,972,472 | A | 11/1990 | Brown et al. | |
|---|---|---|---|---|
| 6,490,353 | B1* | 12/2002 | Tan | H04L 9/088 380/278 |
| 7,792,300 | B1 | 9/2010 | Caronni | |
| 7,958,087 | B2 | 6/2011 | Blumenau | |
| 8,615,668 | B2 | 12/2013 | Matsuda et al. | |
| 10,374,800 | B1* | 8/2019 | Sharifi Mehr | H04L 63/0428 |
| 10,476,665 | B1* | 11/2019 | Griffin | H04L 9/088 |
| 2002/0168068 | A1* | 11/2002 | Nasu | H04N 5/913 380/201 |
| 2003/0026430 | A1* | 2/2003 | Aikawa | H04L 9/002 380/277 |
| 2003/0118185 | A1* | 6/2003 | Lambert | H04L 9/0891 380/263 |
| 2005/0235342 | A1* | 10/2005 | Ene-Pietrosanu | G06F 21/602 726/6 |
| 2006/0204003 | A1* | 9/2006 | Takata | H04L 9/3268 380/30 |

(Continued)

OTHER PUBLICATIONS

Ahmadi et al., "A 3-Level Re-Encryption Model to Ensure Data Protection in Cloud Computing Environments", Dec. 2014, IEEE Conference on Systems, Process and Control, pp. 36-40 (Year: 2014).*

(Continued)

*Primary Examiner* — Kenneth W Chang
(74) *Attorney, Agent, or Firm* — James L. Olsen

(57) ABSTRACT

Aspects of the present disclosure relate to encryption management. A determination can be made whether an encryption algorithm is at-risk. In response to determining that the encryption algorithm is at-risk, data protected by the encryption algorithm can be identified. A security action can then be executed on the data protected by the encryption algorithm.

23 Claims, 12 Drawing Sheets

(56) References Cited

U.S. PATENT DOCUMENTS

| | | | |
|---|---|---|---|
| 2007/0100913 A1* | 5/2007 | Sumner | G06F 11/1453 |
| 2007/0106907 A1* | 5/2007 | Rainsard | G06F 21/62 |
| | | | 380/37 |
| 2008/0059787 A1* | 3/2008 | Hohenberger | H04L 9/3073 |
| | | | 713/153 |
| 2008/0130895 A1* | 6/2008 | Jueneman | H04L 9/3252 |
| | | | 380/277 |
| 2009/0096574 A1 | 4/2009 | Oberle | |
| 2011/0060915 A1 | 3/2011 | Tal | |
| 2012/0079281 A1* | 3/2012 | Lowenstein | H04L 9/0618 |
| | | | 713/189 |
| 2014/0089658 A1 | 3/2014 | Raghuram | |
| 2015/0372994 A1 | 12/2015 | Stuntebeck | |
| 2016/0119292 A1 | 4/2016 | Kaseda et al. | |
| 2017/0193032 A1 | 7/2017 | Kim et al. | |
| 2017/0228325 A1 | 8/2017 | Wilcock | |
| 2017/0251013 A1* | 8/2017 | Kirti | H04L 63/1408 |
| 2017/0373848 A1* | 12/2017 | Osaki | G06F 21/80 |
| 2018/0287789 A1 | 10/2018 | Sridharan | |
| 2018/0359227 A1 | 12/2018 | Trantham | |
| 2019/0258814 A1* | 8/2019 | Heeter | G06K 19/0614 |
| 2020/0409868 A1 | 12/2020 | Durham | |

OTHER PUBLICATIONS

Saito et al., "Enhancing privacy of universal re-encryption scheme for RFID tags", International Conference on Embedded and Ubiquitous Computing, 12 pages, Aug. 2004.

Golle et al., "Universal re-encryption for mixnets", Cryptographers' Track at the RSA Conference. Springer, Berlin, Heidelberg, 2004, 15 pages.

Cui et al., "Attribute-based storage supporting secure deduplication of encrypted data in cloud", IEEE Transactions on Big Data, IEEE Transactions on Big Data, vol. 5, No. 3, Jul.-Sep. 2019, 13 pages.

Abbas et al., "Data Security for Cloud Computing based on Elliptic Curve Integrated Encryption Scheme", International Journal of Applied Information Systems, vol. 10—No. 6, Mar. 2016, 7 pages.

Lu et al., "A Tag-Based Protection Method for Multi-tenant Data Security", ICCCS 2018, pp. 553-565.

Lee et al., "I2SEMS: Interconnects-independent security enhanced shared memory multiprocessor systems", 16th International Conference on Parallel Architecture and Compilation Techniques, 2007, 10 pages.

Vinitha et al., "A secured event log storage management system in cloud computing", International Conference on Information Communication and Embedded Systems, 2014, 5 pages.

Buttyan et al., "Security API analysis with the spi-calculus", vol. LXIII. • Jan. 2008, 6 pages.

Mell et al., "The NIST Definition of Cloud Computing", Recommendations of the National Institute of Standards and Technology, Sep. 2011, 7 pages.

Gupta et al., "Encryption Management", U.S. Appl. No. 16/792,336, filed Feb. 17, 2020.

IBM, List of IBM Patents or Patent Applications Treated as Related, Feb. 14, 2020, 2 pages.

* cited by examiner

ENCRYPTION MANAGEMENT

BACKGROUND

The present disclosure relates generally to the field of security, and more particularly to encryption management.

Encryption is used in computer systems to prevent unauthorized parties from accessing data. Plaintext data can be encrypted to generate ciphertext which can only be read if decrypted. Data can be encrypted by using an encryption algorithm. The data may only be decrypted by applying an encryption key, which reverses the order of the encryption algorithm to convert the ciphertext back into plaintext.

SUMMARY

Embodiments of the present disclosure relate to a method for encryption management. A determination can be made whether an encryption algorithm is at-risk. In response to determining that the encryption algorithm is at-risk, data protected by the encryption algorithm can be identified. A security action can then be executed on the data protected by the encryption algorithm.

The above method can ensure security of data protected by at-risk encryption algorithms. This can prevent malicious entities from being able to intercept, read, receive, or otherwise acquire protected data.

In some embodiments, data protected by the encryption algorithm is identified using a look-up table, wherein the look-up table maps time periods to encryption algorithms, wherein all data associated with a first time-frame mapped to the encryption algorithm is identified.

This can enable locating data to be secured based on the time-frame when it was encrypted. This increases efficiency of the system, as all data associated with a particular time-frame can be identified, rather than checking each piece of data to verify the encryption algorithm used. This increases availability of computing resources such as processor utilization and bandwidth.

In some embodiments, data protected by the encryption algorithm is identified using a look-up table, wherein the look-up table maps encryption algorithms to data locations, wherein data locations mapped to the encryption algorithm are identified.

This can enable locating data to be secured based on the encryption algorithms associated with the data. This increases efficiency of the system, as all data associated with a particular encryption algorithm can be identified, rather than checking each piece of data to verify the encryption algorithm used. This increases availability of computing resources such as processor utilization and bandwidth.

In some embodiments, the security action can include decrypting the data protected by the encryption algorithm and encrypting the data with a second encryption algorithm. This can enhance the security of the data, as the data can be encrypted by a stronger algorithm. Further, the data can be decrypted and re-encrypted using resources of an encryption management system remote from the entity (e.g., customer) that owns the data. This enables protection of data without any impact to customer workloads (e.g., disruption to input/output (I/O) operations).

Embodiments of the present disclosure also relate to a system comprising one or more processors and one or more computer-readable storage media collectively storing program instructions which, when executed by the one or more processors, are configured to cause the one or more processors to perform a method. The method can include determining whether an encryption algorithm is at-risk. In response to determining that the encryption algorithm is at-risk, the method can include identifying data protected by the encryption algorithm. The method can further include executing a security action on the data protected by the encryption algorithm.

The above system can ensure security of data protected by at-risk encryption algorithms. This can prevent malicious entities from being able to intercept, read, receive, or otherwise acquire protected data.

In some embodiments, data protected by the encryption algorithm is identified using a look-up table, wherein the look-up table maps time periods to encryption algorithms, wherein all data associated with a first time-frame mapped to the encryption algorithm is identified.

This can enable locating data to be secured based on the time-frame when it was encrypted. This increases efficiency of the system, as all data associated with a particular time-frame can be identified, rather than checking each piece of data to verify the encryption algorithm used. This increases availability of computing resources such as processor utilization and bandwidth.

In some embodiments, data protected by the encryption algorithm is identified using a look-up table, wherein the look-up table maps encryption algorithms to data locations, wherein data locations mapped to the encryption algorithm are identified.

This can enable locating data to be secured based on the encryption algorithms associated with the data. This increases efficiency of the system, as all data associated with a particular encryption algorithm can be identified, rather than checking each piece of data to verify the encryption algorithm used. This increases availability of computing resources such as processor utilization and bandwidth.

In some embodiments, the security action can include decrypting the data protected by the encryption algorithm and encrypting the data with a second encryption algorithm. This can enhance the security of the data, as the data can be encrypted by a stronger algorithm. Further, the data can be decrypted and re-encrypted using resources of an encryption management system remote from the entity (e.g., customer) that owns the data. This enables protection of data without any impact to customer workloads (e.g., disruption to input/output (I/O) operations).

Embodiments of the present disclosure also relate to a computer program product comprising one or more computer readable storage media, and program instructions collectively stored on the one or more computer readable storage media, the program instructions comprising instructions configured to cause one or more processors to perform a method. The method can include determining whether an encryption algorithm is at-risk. In response to determining that the encryption algorithm is at-risk, the method can include identifying data protected by the encryption algorithm. The method can further include executing a security action on the data protected by the encryption algorithm.

The above computer program product can ensure security of data protected by at-risk encryption algorithms. This can prevent malicious entities from being able to intercept, read, receive, or otherwise acquire protected data.

In some embodiments, data protected by the encryption algorithm is identified using a look-up table, wherein the look-up table maps time periods to encryption algorithms, wherein all data associated with a first time-frame mapped to the encryption algorithm is identified.

This can enable locating data to be secured based on the time-frame when it was encrypted. This increases efficiency of the system, as all data associated with a particular time-frame can be identified, rather than checking each piece of data to verify the encryption algorithm used. This increases availability of computing resources such as processor utilization and bandwidth.

In some embodiments, data protected by the encryption algorithm is identified using a look-up table, wherein the look-up table maps encryption algorithms to data locations, wherein data locations mapped to the encryption algorithm are identified.

This can enable locating data to be secured based on the encryption algorithms associated with the data. This increases efficiency of the system, as all data associated with a particular encryption tag can be identified, rather than checking each piece of data to verify the encryption algorithm used. This increases availability of computing resources such as processor utilization and bandwidth.

In some embodiments, the security action can include decrypting the data protected by the encryption algorithm and encrypting the data with a second encryption algorithm. This can enhance the security of the data, as the data can be encrypted by a stronger algorithm. Further, the data can be decrypted and re-encrypted using resources of an encryption management system remote from the entity (e.g., customer) that owns the data. This enables protection of data without any impact to customer workloads (e.g., disruption to input/output (I/O) operations).

Embodiments of the present disclosure also relate to an additional method for encryption management. An encryption tag can be stored with a data set, the encryption tag including an encryption algorithm indicator specifying an encryption algorithm used to encrypt the data set. A determination can be made that the encryption algorithm used to encrypt the data set is at-risk. The data can be located using the encryption tag. A security action can then be executed on the data set.

The above method can ensure security of data protected by at-risk encryption algorithms. This can prevent malicious entities from being able to intercept, read, receive, or otherwise acquire protected data. Further, this method can enable locating data to be secured based on the encryption tags associated with the data. This increases efficiency of the system, as all data associated with a particular encryption tag can be identified, rather than checking each piece of data to verify the encryption algorithm used. This increases availability of computing resources such as processor utilization and bandwidth.

In some embodiments, the security action can include decrypting the data set and encrypting the data set with a second encryption algorithm. This can enhance the security of the data, as the data can be encrypted by a stronger algorithm. Further, the data can be decrypted and re-encrypted using resources of an encryption management system remote from the entity (e.g., customer) that owns the data. This enables protection of data without any impact to customer workloads (e.g., disruption to input/output (I/O) operations).

In some embodiments, the encryption tag can be updated such that the encryption algorithm indicator specifies that the data set is now protected by the second encryption algorithm. This can ensure that the encryption tag associated with the data is valid based on updates to the encryption scheme applied to the data.

Embodiments of the present disclosure also relate to a system comprising one or more processors and one or more computer-readable storage media collectively storing program instructions which, when executed by the one or more processors, are configured to cause the one or more processors to perform a method. The method can include storing an encryption tag with a data set, the encryption tag including an encryption algorithm indicator specifying an encryption algorithm used to encrypt the data set. The method can further include determining that the encryption algorithm used to encrypt the data set is at-risk. The method can further include locating the data set using the encryption tag. The method can further include executing a security action on the data set.

The above system can ensure security of data protected by at-risk encryption algorithms. This can prevent malicious entities from being able to intercept, read, receive, or otherwise acquire protected data. Further, this system can enable locating data to be secured based on the encryption tags associated with the data. This increases efficiency of the system, as all data associated with a particular encryption tag can be identified, rather than checking each piece of data to verify the encryption algorithm used. This increases availability of computing resources such as processor utilization and bandwidth.

In some embodiments, the security action can include decrypting the data set and encrypting the data set with a second encryption algorithm. This can enhance the security of the data, as the data can be encrypted by a stronger algorithm. Further, the data can be decrypted and re-encrypted using resources of an encryption management system remote from the entity (e.g., customer) that owns the data. This enables protection of data without any impact to customer workloads (e.g., disruption to input/output (I/O) operations).

In some embodiments, the encryption tag can be updated such that the encryption algorithm indicator specifies that the data set is now protected by the second encryption algorithm. This can ensure that the encryption tag associated with the data is valid based on updates to the encryption scheme applied to the data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
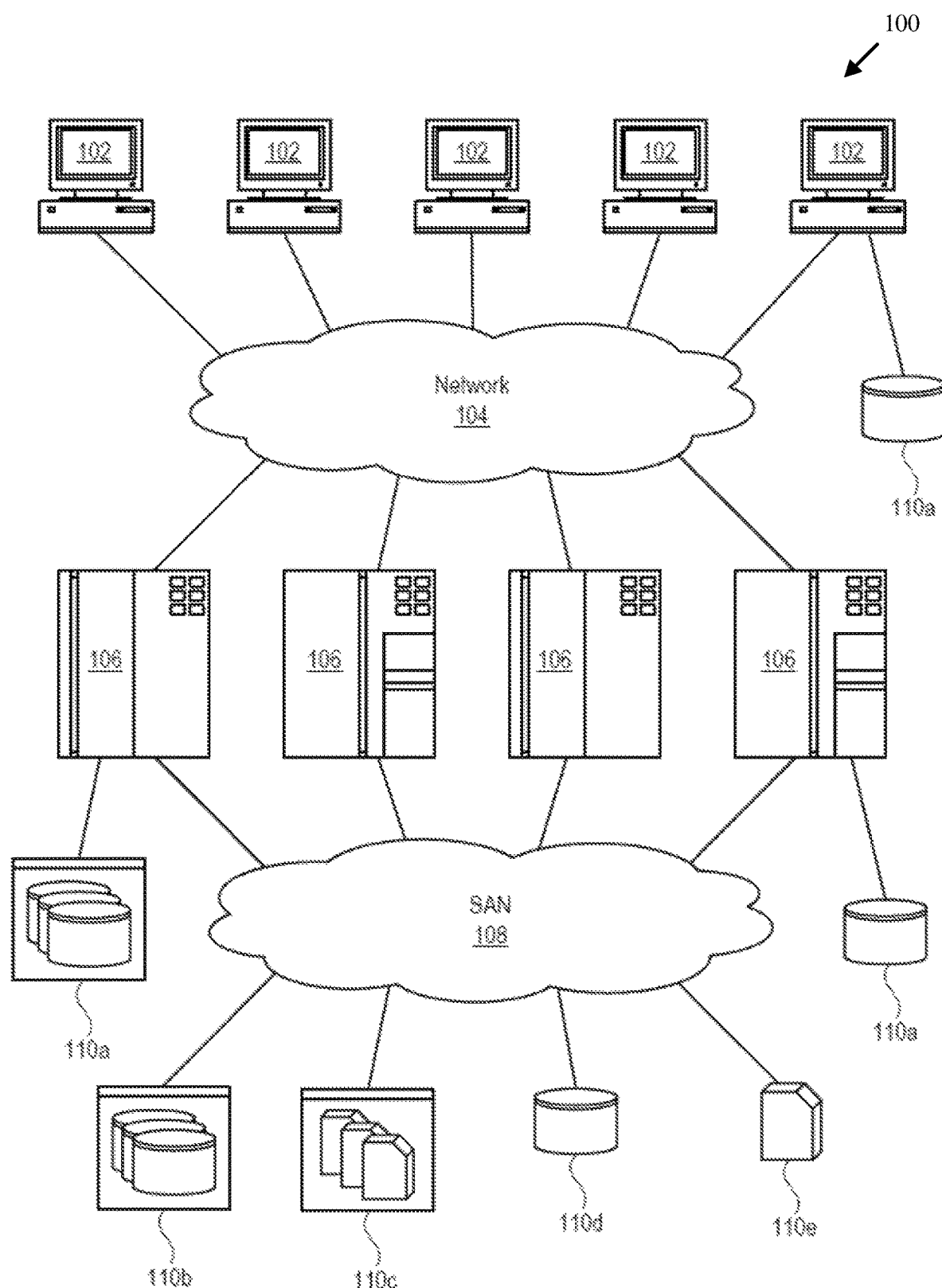
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of security, and more particularly to encryption management. While the present disclosure is not necessarily limited to such applications, various aspects of the disclosure may be appreciated through a discussion of various examples using this context.

It can be difficult to ascertain whether data is encrypted or not. Relying on entropy (i.e., randomness) may not be a suitable indicator, as encryption algorithms may increase or decrease entropy. As such, encrypted data can be indistinguishable from unencrypted data. However, it may be important to know whether a given set of data is encrypted or unencrypted. For example, if an encryption bit stored in memory (e.g., a non-volatile dual in-line memory module (NVDIMM)) is incorrect, inaccurate processing of data could occur. In this instance, if the data was tagged with encryption information, then the data could have been accurately processed regardless of the erroneous encryption bit.

In addition to associating an encryption status with a data set, it may be beneficial to store encryption details, such as the type of encryption algorithm used and/or the encryption key length, with the data set. This can be useful in instances where the data set is required to be decrypted in the future. For example, as advances in data processing are made, many known encryption algorithms may be at-risk in the future. Encryption algorithms which were thought to be impenetrable may be obsolete in the coming decades. In view of the above, it would be beneficial to quickly decrypt and re-encrypt the data with a different algorithm.

Aspects of the present disclosure relate to an encryption management system. An indication of a data set to be tagged with an encryption tag can be received. A location for the encryption tag can be determined. The encryption tag can be stored at the location, where the encryption tag includes an encryption status indicator specifying whether or not the data is encrypted and an encryption algorithm indicator specifying an encryption algorithm used to encrypt the data.

Thus, encryption tags can be associated with data to describe the encryption status of the data. This allows administrators to be able to quickly identify encryption schemes applied to data. In instances where encryption information is required to accurately process the data, the encryption information can be referenced such that the data can be accurately processed. Further, by storing the tag in a location where the encryption is applied, efficiency of the system can be increased as the tag can be checked while the data is being handled.

Aspects of the present disclosure further relate to increasing the security of data within a system. A determination can be made whether an encryption algorithm is at-risk. In response to determining that the encryption algorithm is at-risk, data protected by the encryption algorithm can be identified. A security action can then be executed on the data protected by the encryption algorithm.

Thus, risk associated with encryption algorithms can be gauged and, if the risk is high for a particular encryption algorithm, the data protected by said algorithm can be protected. For example, the data can be decrypted and re-encrypted by a second, secure, encryption algorithm. In embodiments, encryption tags can be referenced such that data protected by an at-risk algorithm can be quickly located and secured. This increases the computing efficiency of the system, as, rather than checking each piece of data to verify the encryption algorithm that is used, all data associated with a particular tag can identified. This increases availability of computing resources such as processor utilization and bandwidth. Further, the data can be secured using resources of a management system remote from the entity (e.g., customer) that owns the data. This enables protection of data without any impact to customer workloads (e.g., disruption to input/output (I/O) operations).

Referring to FIG. 1, an example network environment is shown, in accordance with embodiments of the present disclosure. The network environment 100 is presented to show one example of an environment where systems and methods in accordance with the disclosure may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110*a* (e.g., arrays of hard-disk drives, solid-state drives, tape drives, etc.). These computers 102, 106 and direct-attached storage systems 110*a* may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This storage network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
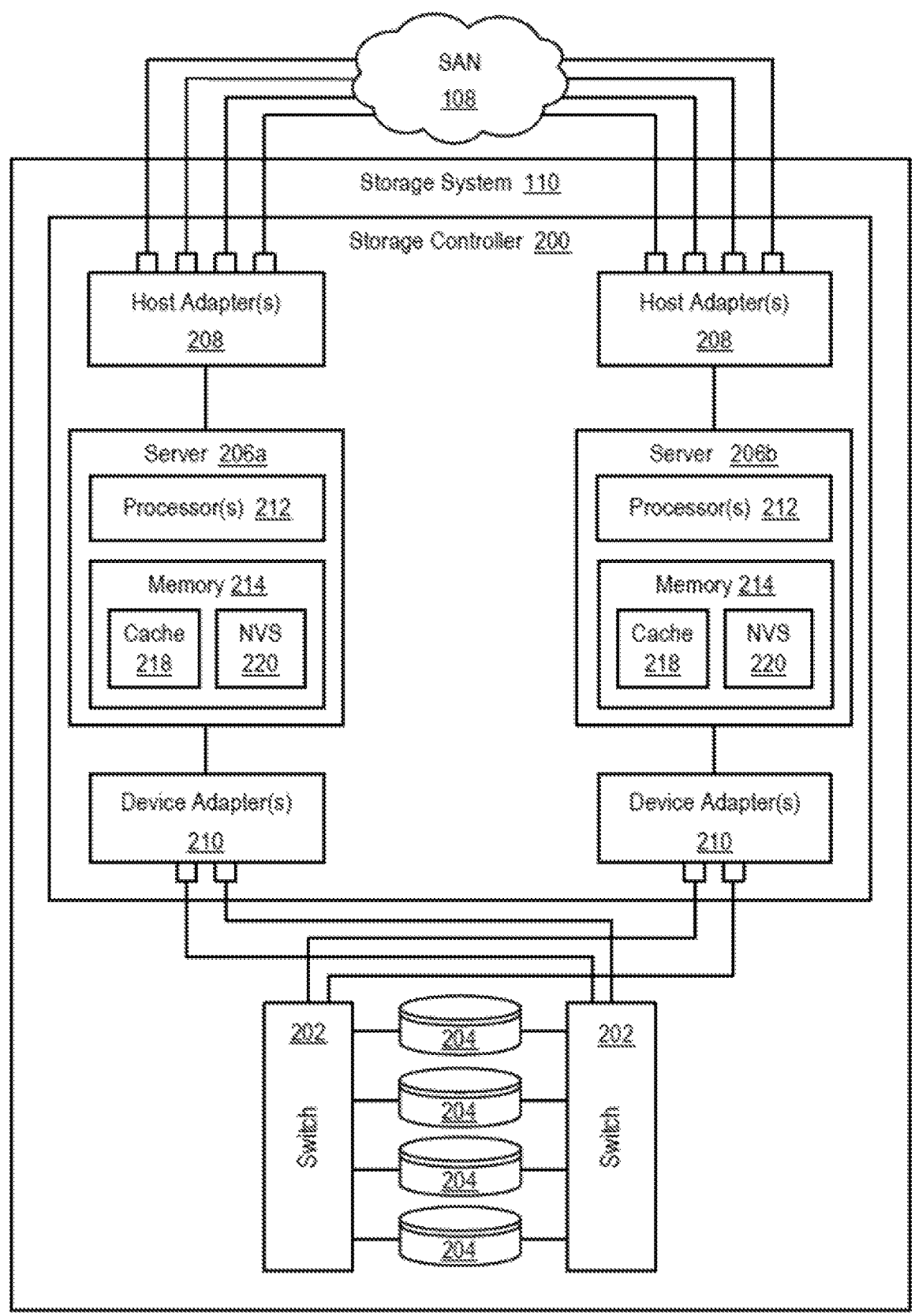
FIG. 2 is a block diagram illustrating an example storage system, in accordance with embodiments of the present disclosure.

Referring to FIG. 2, a storage system 110 containing an array of hard-disk drives 204 and/or solid-state drives 204 is illustrated, in accordance with embodiments of the present disclosure. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it in its cache 218 in the event it is required again. If the data is requested again by a host system 106, the server 206 may fetch the data from the cache 218 instead of fetching it from the storage drives 204, saving both time and resources. Similarly, when a host system performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000® enterprise storage system. The DS8000® is a high-performance, high-capacity storage controller providing disk storage that is designed to support continuous operations. Nevertheless, the systems and methods disclosed herein are not limited to operation with the IBM DS8000® enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000® is presented by way of example and is not intended to be limiting.

Figure 3:
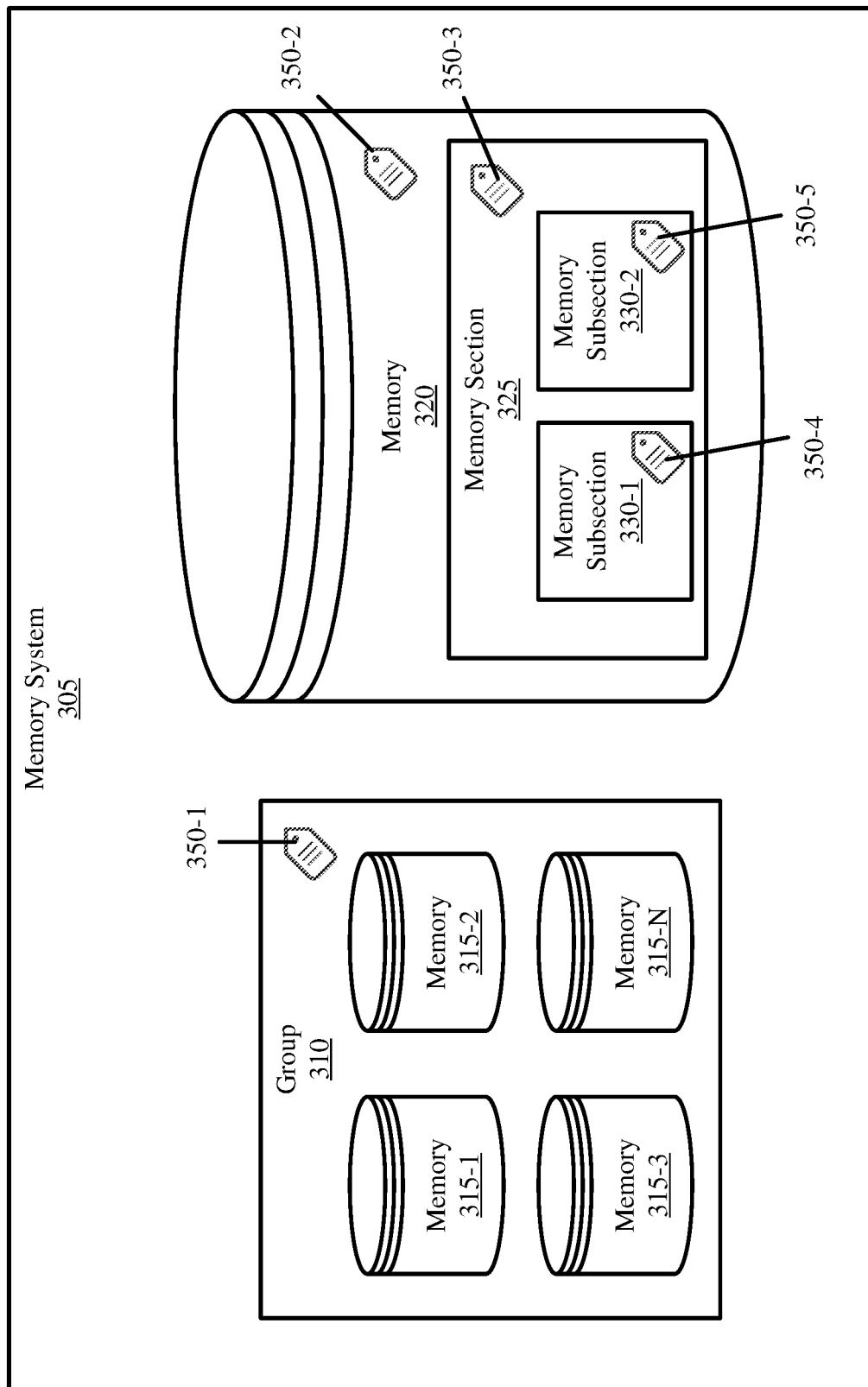
FIG. 3 is a block diagram illustrating an example memory system having encryption tags, in accordance with embodiments of the present disclosure.

Referring now to FIG. 3, shown is an example memory system 305 having a plurality of memories (individually memories 315-1, 315-2, 315-3 . . . 315-N and memory 320), in accordance with embodiments of the present disclosure. As referred to herein, memories can include memory and/or storage options described with respect to FIGS. 1-2. For example, memories can include hard disk drives, solid-state drives, DRAM, storage class memory (SCM), flash-memory, tape storage, and others.

Memories can be tagged with encryption tags 350 (individually encryption tags 350-1, 350-2, 350-3, 350-4, and 350-5). The memories can be tagged with encryption tags on any suitable granularity. For example, a group 310 including memories 315-1, 315-2, 315-3 . . . 315-N can be tagged with an encryption tag 350-1. Memories within the group 310 can differ. For example, memory 315-1 can be a hard-disk drive, memory 315-2 can be a solid-state drive, memory 315-3 can be a DRAM-based cache, memory 315-N can be a heterogenous cache including DRAM and SCM, etc. The encryption tag 350-1 can describe encryption information associated with the memories within the group 310. This can be useful when a single encryption scheme (e.g., an encryption algorithm/key pair) is applied to the group 310. In embodiments, each memory within the group 310 can store a copy of the encryption tag 350-1.

As another example depicting storing encryption tags on various memory granularities, as shown in FIG. 3, a single memory 320 (e.g., a memory device such as a hard-disk drive) can include an encryption tag 350-2. Thus, the encryption tag 350-2 describes encryption information for the memory 320. This can be useful when a single encryption scheme is applied to the memory 320. In some embodiments, a memory section 325 (e.g., a partition of memory 320) can include an encryption tag 350-3. This can be useful when different memory sections have different encryption schemes. Further still, memory subsections, such as memory subsections 330-1 and memory subsections 330-2, can include corresponding encryption tags, such as encryptions tags 350-4 and 350-5, respectively. As such, encryption tags can be stored on any suitable granularity of memory. The granularity encryption tags 350 are stored on can depend on the granularity at which encryption schemes are applied.

As an example, assume memory 320 is a hard-disk drive. In this example, encryption tag 350-2 can be stored within the hard-disk drive representing the encryption state of the entire hard-disk drive. Alternatively, encryption tag 350-3 can be stored within an extent (e.g., a contiguous area of storage represented as a range of block numbers or tracks) to represent the encryption state of the extent, where the extent is a memory section 325 of the hard-disk drive. As an example, a first extent can include a first encryption tag while a second extent can include a second encryption tag.

Alternatively, encryption tag 350-4 or 350-5 can be stored within (and configured to represent an encryption state of) a block, track, sector, cluster or any other memory subsection 330 of the hard-disk drive. As an example, a first track within the hard-disk drive can include a first encryption tag while a second track within the hard-disk drive can include a second encryption tag.

As another example, assume memory 320 is a DRAM and/or SCM based cache. In this example, encryption tag 350-2 can be stored within the cache representing the encryption state of the entire cache. Alternatively, encryption tag 350-3 can be stored within a track of the cache, where the track is a memory section 325 of the cache. For example, a first encryption tag can be stored within a first track of the cache while a second encryption tag can be stored within a second track of the cache. Alternatively, encryption tags 350-4 and/or 350-5 can be stored within segments (e.g., where 17 segments comprise a track) of the cache, where the segments are memory subsections 330 of the cache.

The size of encryption tags can vary depending on the amount of data stored therein. For example, an encryption tag can be 16 bytes, 32 bytes, 64 bytes, 1 kilobyte (KB), 1 megabyte (MB), etc. Bits stored within the encryption tag can indicate encryption characteristics. For example, a first bit can indicate an encryption status (e.g., whether the data is encrypted or not), a second bit (or sequence of bits) can indicate an encryption algorithm (e.g., the type of encryption algorithm used, such as secure hash algorithm (SHA)), a third bit can indicate a key length (e.g., 256 bit, 1024 bit, etc.), etc.

Figure 4:
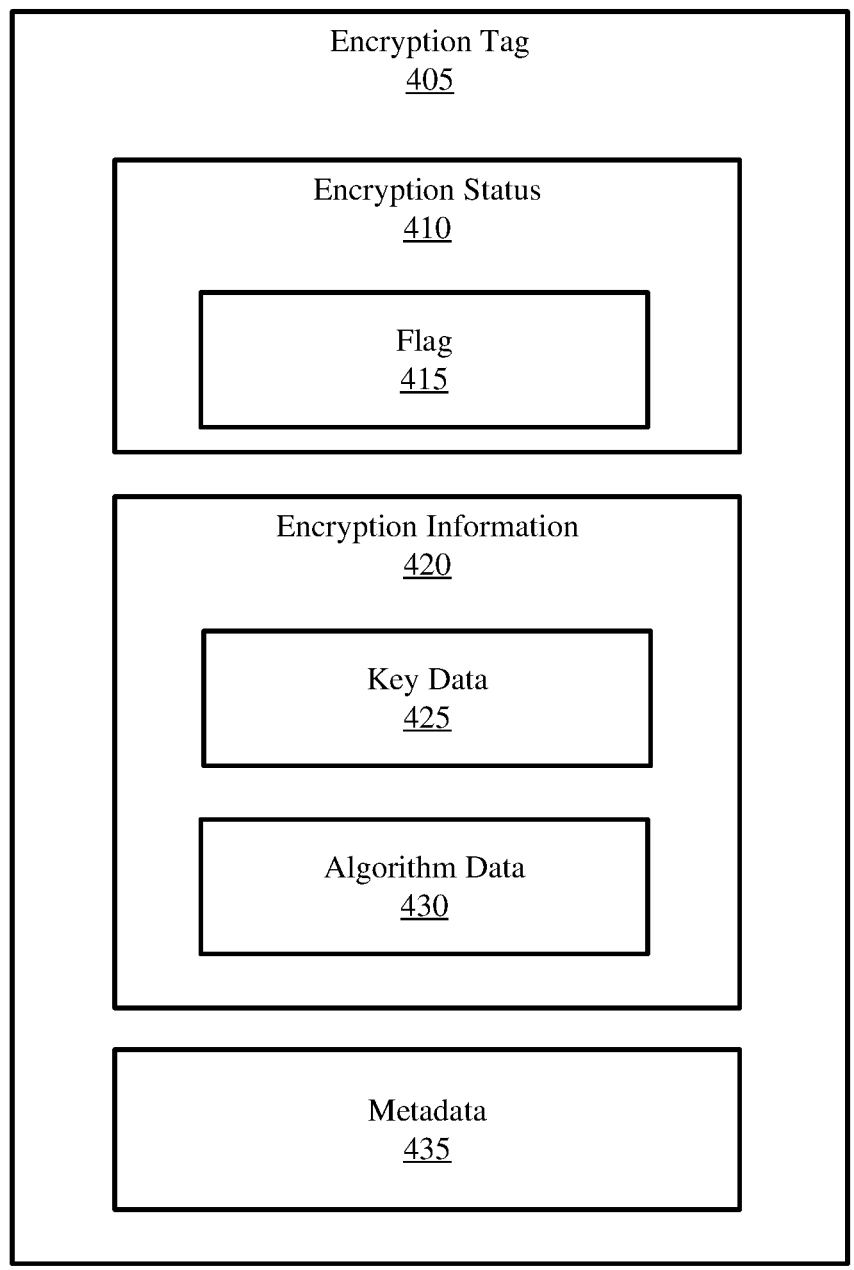
FIG. 4 is a block diagram illustrating an example encryption tag, in accordance with embodiments of the present disclosure.

Referring now to FIG. 4, shown is an example encryption tag 405 format, in accordance with embodiments of the present disclosure. The encryption tag 405 can be the same as, or substantially similar to, the encryption tags 350 depicted in FIG. 3. The encryption tag 405 includes an encryption status 410, encryption information 420, and metadata 435.

The encryption status 410 indicates whether or not the data associated with the encryption tag 405 is encrypted. In embodiments, a flag 415 can indicate the encryption status. For example, the flag 415 can simply be a bit position within the encryption tag. In embodiments, a 0 bit value at the encryption status bit position indicates an unencrypted status whereas a 1 bit value at the encryption status bit position indicates an encrypted status.

The encryption information 420 includes data pertaining to the encryption scheme applied to the data associated with the encryption tag 405. In embodiments, if the encryption status 410 indicates that the data is unencrypted, then no data is stored within the encryption information 420. Alternatively, bits corresponding to the encryption information 420 can be set to off (e.g., 0). In embodiments, if the encryption status 410 indicates that the data is encrypted, then the encryption information 420 includes key data 425 and algorithm data 430. The key data 425 can store information associated with the encryption key used in the encryption scheme (e.g., the key length or key ID). The algorithm data 430 can store information regarding the encryption algorithm used in the encryption scheme. In embodiments, a mapping table can be used to map bit values stored within key data 425 and algorithm data 430 fields to particular encryption keys and/or algorithms. Example encryption algorithms include, but are not limited to: Triple DES, RSA, Blowfish, Twofish, AES, IDEA, SHA, Rijndael, RC2-6, W7, and others. In embodiments, the key data 425 and algorithm data 430 can be used to search for data encrypted by particular keys and/or algorithms. Such information can be referenced when attempting to decrypt data protected by a particular key and/or algorithm.

The encryption tag 405 can also include metadata 435. The metadata 435 can include information such as the author that generated the tag, the time/date the tag was created, descriptors of the data associated with the encryption tag 405, and other information. In embodiments, the metadata 435 can be used to search for encryption tags generated by a particular author and/or for encryption tags generated within a given time window.

Figure 5:
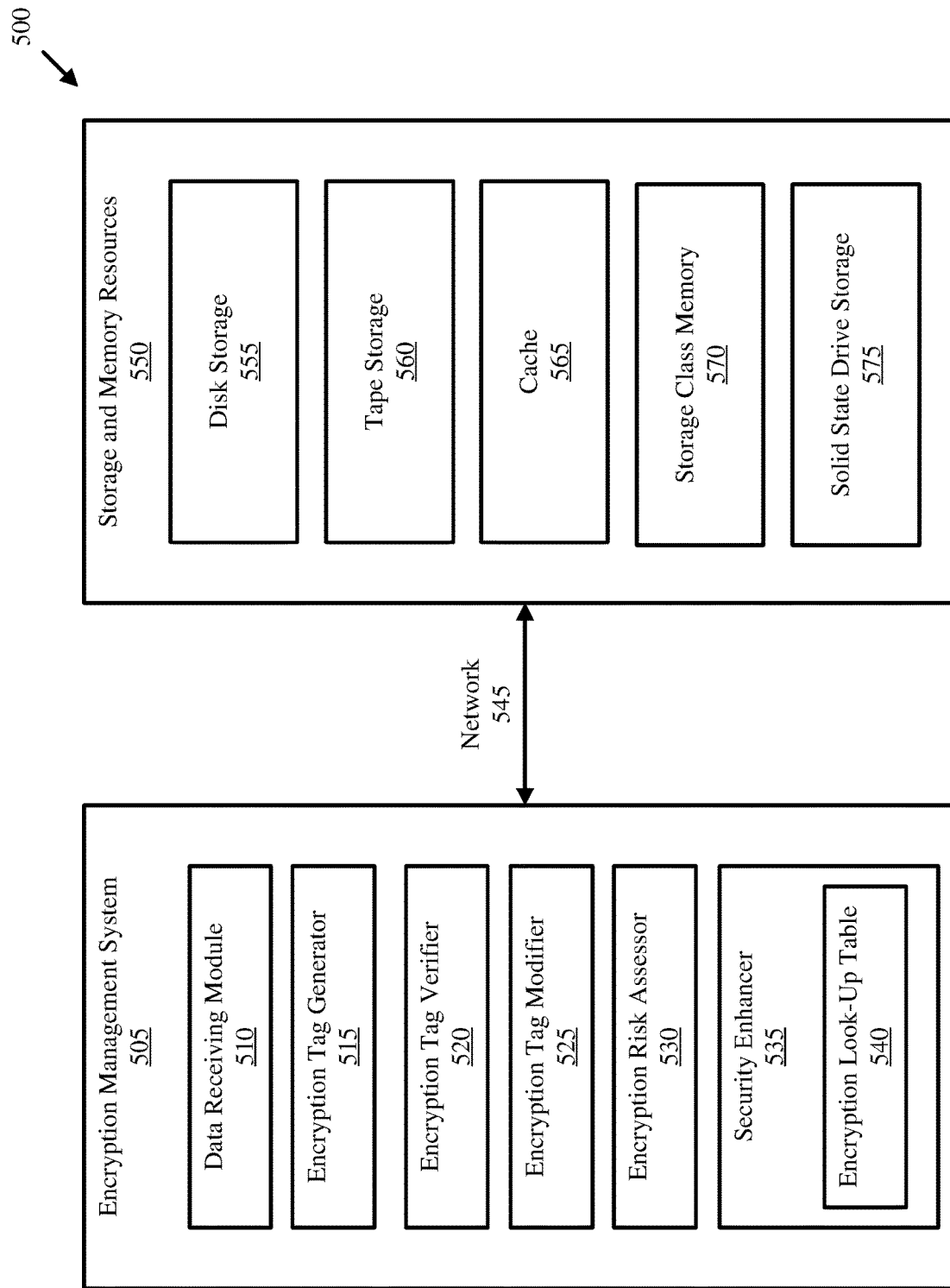
FIG. 5 is a block diagram illustrating an encryption management system communicatively coupled to storage and memory resources, in accordance with embodiments of the present disclosure.

Referring now to FIG. 5, shown is an example computing environment 500 in which illustrative embodiments of the present disclosure can be implemented. The computing environment 500 includes an encryption management system 505 communicatively coupled to storage and memory resources 550 via a network 545. Communication between the storage and memory resources 550 and encryption management system 505 can be substantially similar to network environment 100.

Storage and memory resources 550 can be the same as, or substantially similar to, storage and memory resources described with respect to FIGS. 1-3. For example, the storage and memory resources 550 can include disk storage 555, tape storage 560, cache 565, storage class memory (SCM) 570, and solid-state drive (SSD) storage 575.

As shown in FIG. 5, the encryption management system 505 includes a data receiving module 510, an encryption tag generator 515, an encryption tag verifier 520, an encryption tag modifier 525, an encryption risk assessor 530, and a security enhancer 535. The data receiving module 510 can be configured to receive data such that functionalities performed by the modules 515-535 can be completed.

The encryption tag generator 515 is configured to generate encryption tags. The encryption tags can be the same as, or substantially similar to, encryption tags 350 described with respect to FIG. 3 or encryption tag 405 described with respect to FIG. 4. In embodiments, the encryption tag generator 515 can generate encryption tags based on requests. The encryption tags can be generated for in-flight and at-rest data. In some embodiments, the encryption tag generator 515 can be configured to automatically generate encryption tags in response to conventional data handling procedures (e.g., performed by a storage controller, such as storage controller 200) occurring with storage and memory resources 550. Such data handling procedures include transferring data, generating data, encrypting data, decrypting data, demoting data (e.g., from cache 565 to disk storage 555), destaging data, and others. For example, in response to a data handling procedure occurring, a first encryption tag can be generated for data affected by the data handling procedure.

In some embodiments, the encryption tag generator 515 can be configured to encrypt the encryption tag stored with the data of interest. For example, a master encryption scheme can be used to conceal the data included in each encryption tag associated with the storage and memory resources 550.

The encryption tag verifier 520 is configured to verify that data within the encryption tags match the actual encryption status and/or algorithm info associated with storage and memory resources 550. The encryption tag verifier 520 can be configured to inspect the encryption status (e.g., an encryption bit stored within memory or a flag otherwise indicative of encryption status) and/or algorithm information associated with storage and memory resources 550 and compare the encryption status and/or algorithm data to the encryption status and/or algorithm data stored within the encryption tag.

If the encryption status associated with the memory does not match the encryption status indicated in the encryption tag, then the encryption tag verifier 520 can be configured to record an error. In some embodiments, the encryption tag verifier 520 can transmit the error to the encryption tag modifier 525. The encryption tag modifier 525 can then be configured to update the encryption status within the encryption tag to match the actual encryption status. In some embodiments, the encryption tag verifier 520 can alter the encryption status in memory to match the encryption status within the encryption tag.

Similarly, if the encryption information (e.g., encryption algorithm and/or key) associated with the memory does not match the encryption information indicated in the encryption tag, then the encryption tag verifier 520 can be configured to record an error. The encryption tag modifier can then be configured to update the encryption tag such that the encryption information associated with the memory matches the encryption information indicated in the encryption tag. In some embodiments, the encryption tag verifier 520 can alter the encryption algorithm to match the encryption information within the encryption tag. For example, the encryption tag verifier 520 can be configured to decrypt the data within the memory and storage resources 550 such that the data can be re-encrypted with the corresponding algorithm and key stored within the encryption tag.

The encryption risk assessor 530 can be configured to determine risk ("a risk level") associated with particular encryption schemes (e.g., encryption algorithms and/or keys). In some embodiments, the encryption risk assessor 530 can be configured to parse text resources (e.g., publications, databases, etc.) to determine the encryption scheme risk level. The determination may consider key words (e.g., "at-risk," "cracked," "hacked," "prone,", etc.), sentiment, pre-defined rules (e.g., observance of a particular string leads to a higher risk), and other factors. The encryption risk assessor 530 can be configured to perform various machine learning (ML)-based methods to classify risk including, but not limited to logistic regression, Naïve Bayes, support vector machines, k-nearest neighbor, decision trees, neural networks, and learning vector quantization. In some embodiments, the encryption risk assessor 530 can be configured to receive manual input indicating encryption risk level of specific encryption schemes. For example, a user can indicate whether a particular key and/or algorithm has been exposed.

In embodiments, the encryption risk assessor 530 can be configured to compare a determined risk level (e.g., via ML or manual input) to a risk threshold to determine whether the data should be secured by the security enhancer 535. In embodiments, if the determined risk level exceeds a risk threshold, then the security enhancer 535 can be configured to enhance the security of the at-risk data. For example, assume an encryption risk threshold is set to 0.80 such that any risk level of 0.80 or higher exceeds the risk threshold. In this example, if the determined risk level is 0.60, then no actions will be performed by the security enhancer 535. However, if the determined risk level is 0.85, then the security enhancer 535 can be called to execute a security action to enhance the security of the at risk data.

Various security actions can be executed by the security enhancer 535. In some embodiments, the security enhancer 535 can be configured to decrypt the at-risk data and re-encrypt the at-risk data with a second encryption scheme. In embodiments, the second encryption scheme may be stronger (e.g., protected by a stronger algorithm, protected by a longer key, etc.) than the original encryption algorithm. In some embodiments, the security enhancer 535 can further encrypt the encrypted data. For example, the data encrypted by a first encryption algorithm could be further encrypted by a second encryption algorithm. Thus, to unlock the data, a user would be required to authenticate both encryption schemes based on the order they were applied. In some embodiments, the security enhancer 535 can apply a virtual air gap, effectively severing the storage and memory resources 550 from the network 545 or any other external networks until the data is secured (e.g., until the risk level drops).

The security enhancer 535 can locate and secure at-risk data in any suitable manner. In embodiments, the security enhancer references an encryption look-up table 540 such that data associated with at-risk encryption schemes can be readily located and secured. In some embodiments, the encryption look-up table 540 associates data locations (e.g., storage group identifications (ID's), storage device ID's, storage partitions ID's, etc.) with encryption tags. The encryption tags can then be referenced to determine which storage and memory resources 550 to secure. For example, assume memory locations A, B, and C are all indicated as tagged by encryption tag Z according to the encryption look-up table 540. In this example, if the encryption algorithm associated with encryption tag Z was identified as at-risk, then the security enhancer 535 could secure memory locations A, B, and C (e.g., by decrypting the data stored in memory locations A, B, and C, and re-encrypting the data with a second encryption algorithm). This depicts an example for securing at-rest data. Securing at-rest data can be completed on a large scale. For example, many gigabytes or terabytes of data could be decrypted and re-encrypted by the security enhancer 535 in a single batch based on an at-risk encryption scheme present in an encryption tag.

For in-flight data, the security enhancer 535 can be configured to inspect the encryption tag during a data handling procedure to determine whether an at-risk encryption scheme is present (as indicated by the encryption risk assessor 530). If an at-risk encryption scheme is present, then security enhancer 535 can be configured to secure the data.

In some embodiments, rather than or in addition to referencing encryption tags, the encryption look-up table 540 can map time frames (i.e., time stamps) to encryption schemes. Metadata associated with a particular time frame can then be searched to identify data protected by a particular encryption scheme. For example, the encryption look-up table 540 could indicate that a first encryption scheme was applied to data at a first time period (e.g., from Sep. 18, 2017-Sep. 18, 2018), while a second encryption scheme was applied to data at a second time period (e.g., from Sep. 19, 2018-Sep. 19, 2019). In this example, if the first encryption scheme is indicated as at-risk, then the security enhancer 535 can apply a security action on all data that was encrypted within the first time period. Thus, the security enhancer 535 can use metadata indicating when the data was encrypted to locate and secure data within the system.

Though aspects of the present disclosure refer to altering security protocols applied to data, it is understood that other code updates (e.g., application and/or OS updates) maybe be required in light of the new security updates. Further, though reference is made to particular determined risk levels and encryption risk thresholds, in embodiments, any suitable values can be used in place of the provided example values without departing from the spirit and scope of the present disclosure.

Figure 6:
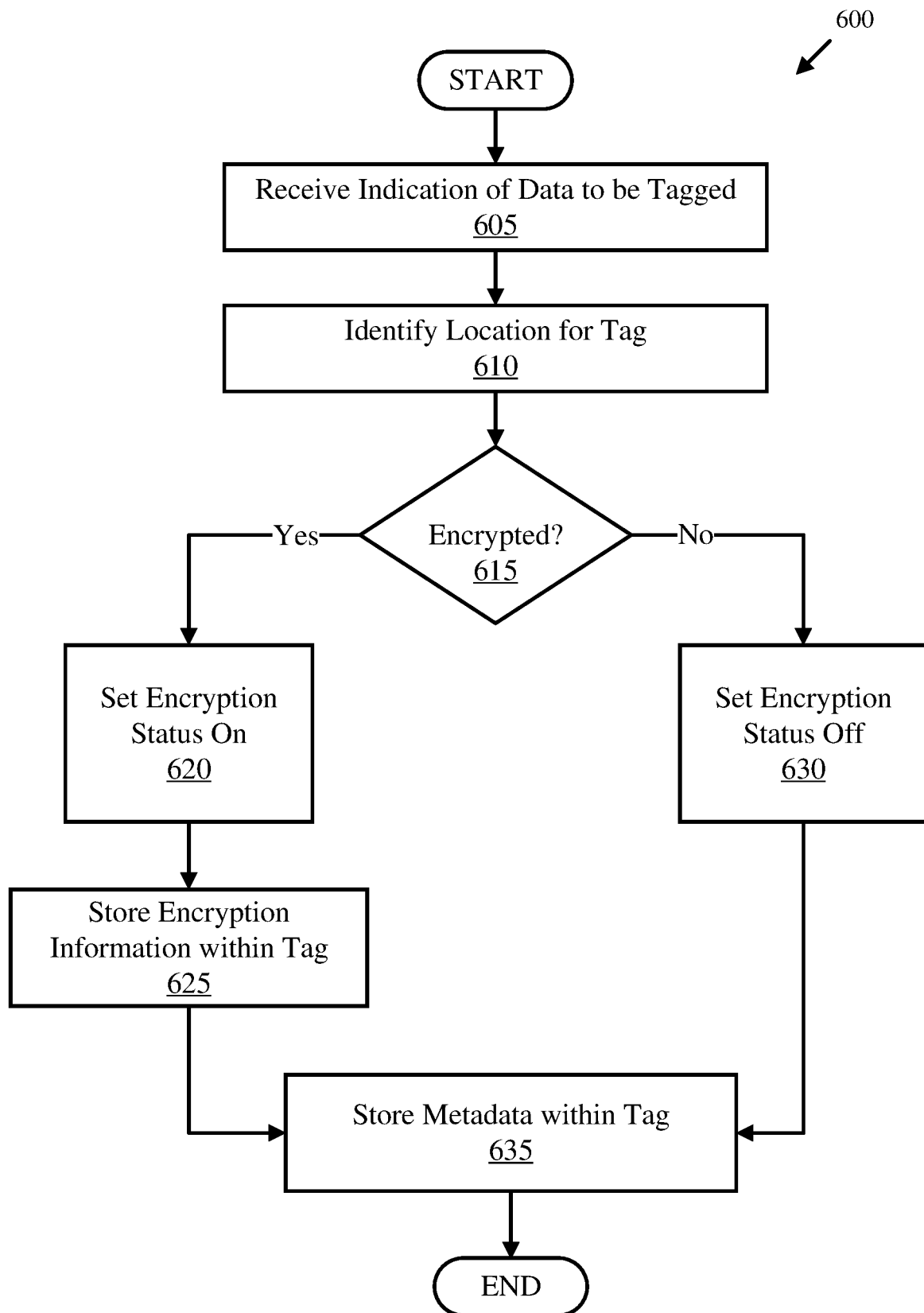
FIG. 6 is a flow-diagram illustrating an example method for configuring an encryption tag, in accordance with embodiments of the present disclosure.

Referring now to FIG. 6, shown is a flow-diagram illustrating an example method 600 for configuring an encryption tag, in accordance with embodiments of the present disclosure.

Method 600 initiates at operation 605, where an indication of data to be tagged with encryption information is received. In embodiments, the indication can be received by a user. In embodiments, the indication can be received based on a rule or policy. For example, if a policy is set that dictates that all data transferred in the future is required to be tagged, then the indication can be received based on the policy being triggered (e.g., when a set of data is transferred).

A location for the tag is then identified. This is illustrated at operation 610. The tag can be stored on any suitable memory granularity. In embodiments, memory groups, memory devices, memory sections, or memory subsections can be tagged to represent the encryption state of the respective granularity that the tag is stored on.

A determination is then made whether the data to be tagged is encrypted. This is illustrated at operation 615. If a determination is made that the data is encrypted ("Yes" at operation 615), then an encryption status within the tag is set to "on." This is illustrated at operation 620. Encryption information is then stored within the tag. This is illustrated at operation 625. The encryption information can be the same as, or substantially similar to, encryption information 420 described with respect to FIG. 4. For example, the encryption information can include details regarding the encryption algorithm and/or encryption key applied to the data (e.g., an encryption algorithm identifier, a key identifier, a key length, etc.).

If a determination is made that the data is unencrypted ("No" at operation 615), then an encryption status within the tag is set to "off." This is illustrated at operation 630. After the encryption status is set to "off" at operation 630, or after encryption information is stored within the encryption tag at operation 625, metadata is stored within the tag. This is illustrated at operation 635. The metadata can be the same as, or substantially similar to, the metadata 435 described with respect to FIG. 4.

The aforementioned operations can be completed in any order and are not limited to those described. Additionally, some, all, or none of the aforementioned operations can be completed, while still remaining within the spirit and scope of the present disclosure.

Figure 7:
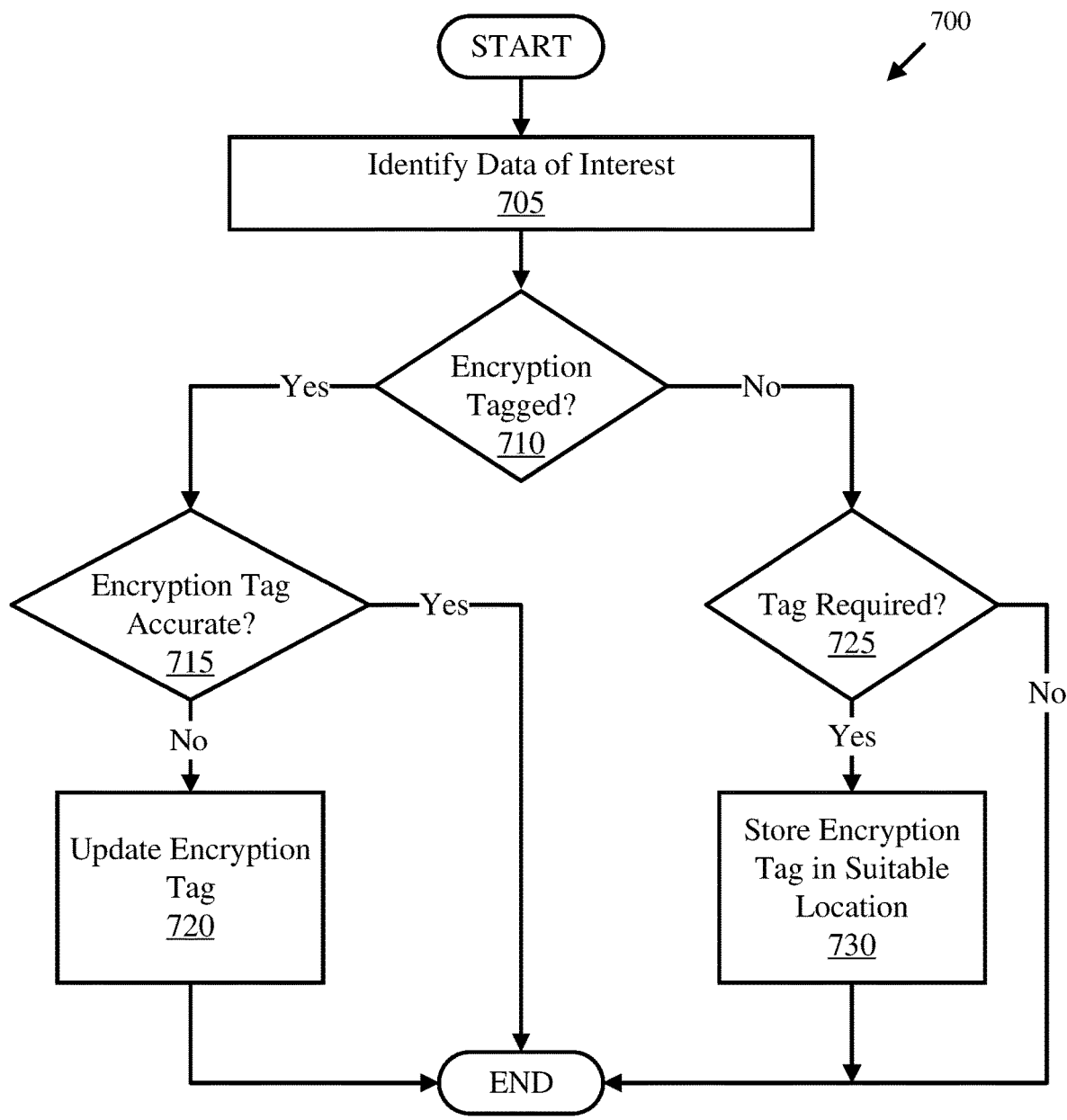
FIG. 7 is a flow-diagram illustrating an example method for encryption management, in accordance with embodiments of the present disclosure.

Referring now to FIG. 7, shown is an example method 700 for encryption tag management, in accordance with embodiments of the present disclosure. Method 700 initiates at operation 705, where data of interest is identified. In some embodiments, the data of interest can be identified based on a look-up table, such as encryption look-up table 540 of FIG. 5. For example, all data modified within a given time frame can be identified for encryption management. As another example, all data having a particular encryption tag can be identified for encryption management.

A determination is made whether the data of interest is tagged with an encryption tag. This is illustrated at operation 710. If a determination is made that the data of interest is tagged for encryption ("Yes" at operation 710), a determination is made whether the encryption tag is accurate. This is illustrated at operation 715. Determining whether the encryption tag is accurate can be completed by comparing the encryption scheme applied to the data with the information stored within the tag. For example, if the data is unencrypted (e.g., an encryption bit within an NVDIMM address is set to off), and the encryption tag indicates that the data is encrypted, then a determination can be made that the encryption tag is inaccurate. As another example, if the encryption tag indicates that the data of interest is protected by a first encryption algorithm, but the data of interest is actually protected by a second encryption algorithm, then a determination can be made that the encryption tag is inaccurate.

If a determination is made that the encryption tag is accurate ("Yes" at operation 715), then method 700 ends, as the encryption tag is verified as accurate. If a determination is made that the encryption tag is inaccurate ("No" at operation 715), then the encryption tag is updated. This is illustrated at operation 720. The encryption tag can be updated to reflect the actual encryption status of the data. For example, the encryption status, encryption algorithm, and/or encryption key information can be altered such that the tag accurate reflects the encryption scheme applied to the data.

In some embodiments, rather than updating the encryption tag, the encryption scheme applied to the data can be updated to reflect the tag. For example, if an encryption tag indicates that the data of interest is encrypted by a first encryption algorithm, but the data of interest is actually encrypted by a second algorithm, then the data of interest can be decrypted and re-encrypted with the first encryption algorithm.

If a determination is made that the data is not encryption tagged ("No" at operation 710), then a determination is made whether an encryption tag is required. This is illustrated at operation 725. In embodiments, determining whether an encryption tag is required can be completed based on a user indication. In some embodiments, all data associated with a system is automatically tagged with encryption tags. In these embodiments, any data missing an encryption tag is automatically determined to require an encryption tag. In some embodiments, determining whether an encryption tag is required can be determined based on a table indicating memory locations that require encryption tags.

If an encryption tag is not required ("No" at operation 725), then method 700 ends, as no encryption management is necessary for this data of interest. However, if an encryption tag is required ("Yes" at operation 725), then the encryption tag is stored in a suitable location (e.g., a location where the data of interest resides). This is illustrated at operation 730. The location for the tag can depend on the granularity for which the encryption scheme applies. For example, if the tag is intended to represent the encryption state of an extent, then the tag can be stored within the extent. However, the tag does not necessarily have to be physically stored with the data of interest. For example, if the tag represents the encryption state of a group of memories, the tag can be stored on a separate memory device within the group.

The aforementioned operations can be completed in any order and are not limited to those described. Additionally, some, all, or none of the aforementioned operations can be completed, while still remaining within the spirit and scope of the present disclosure.

Figure 8:
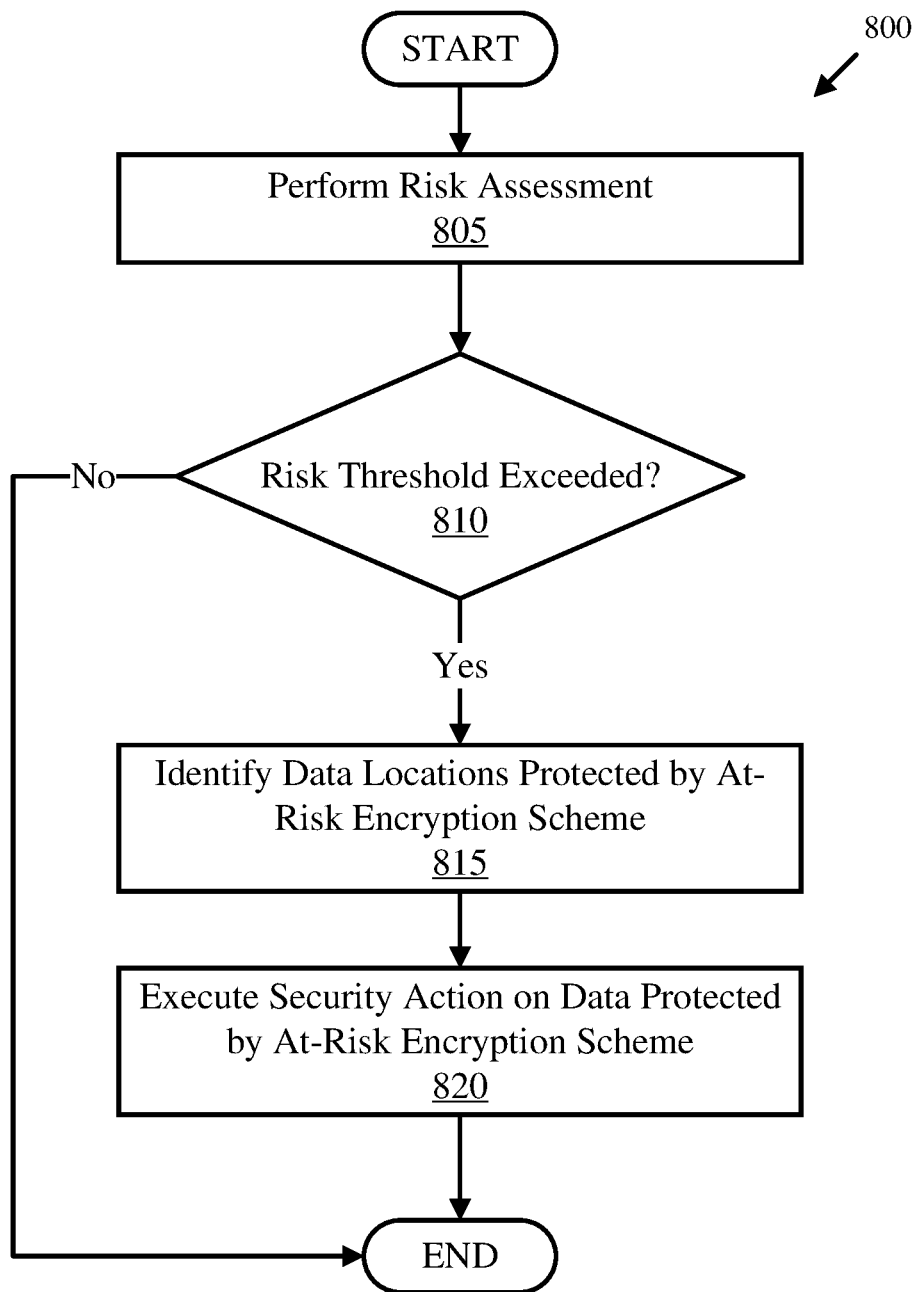
FIG. 8 is a flow-diagram illustrating an example method for enhancing the security of at-risk data, in accordance with embodiments of the present disclosure.

Referring now to FIG. 8, shown is an example method 800 for securing at-risk data, in accordance with embodiments of the present disclosure.

Method 800 initiates at operation 805, where a risk assessment is performed. The risk assessment may be performed in the same, or a substantially similar manner, as described with respect to the encryption risk assessor 530 of FIG. 5. For example, risk assessment can include analyzing text resources (e.g., publications, news articles, press releases, etc.) to identify vulnerable encryption algorithms, keys, passwords, and the like. In embodiments, the risk assessment can be performed using machine learning (ML) algorithms. In some embodiments, the risk assessment can be manually conducted by a system administrator. The risk assessment can yield a risk value indicative of risk associated with a particular encryption scheme.

A determination is made whether a risk threshold is exceeded. This is illustrated at operation 810. Thus, at operation 810, the risk value obtained from the risk assessment at operation 805 is compared to a risk threshold. If the risk value does not exceed the risk threshold ("No" at operation 810), then method 800 ends.

If the risk value does exceed the risk threshold ("Yes" at operation 810), then locations of data protected by the at-risk encryption scheme are identified. This is illustrated at operation 815. The locations protected by the at-risk encryption scheme can be identified in any suitable manner. In some embodiments a look-up table mapping encryption tags to data locations can be referenced. Any locations associated with encryption tags including the at-risk encryption scheme can then be identified in the look-up table. In some embodiments, a look-up table mapping time frames to encryption schemes can be referenced to identify locations protected by at-risk encryption schemes. In these embodiments, locations which were updated within a time-frame associated with an at-risk encryption scheme can be identified. However, in some embodiments, the locations can be manually selected by a system administrator.

A security action can then be executed on the data protected by the at-risk encryption scheme. This is illustrated at operation 820. The security actions can be the same as, or substantially similar to, the security actions described with respect to the security enhancer 535 of FIG. 5. For example, security actions can include decrypting data and re-encrypting the data with a second encryption scheme, further encrypting the data, and applying a virtual air gap, to name a few. Upon execution of the security action (s), method 800 ends.

The aforementioned operations can be completed in any order and are not limited to those described. Additionally, some, all, or none of the aforementioned operations can be completed, while still remaining within the spirit and scope of the present disclosure.

Figure 9:
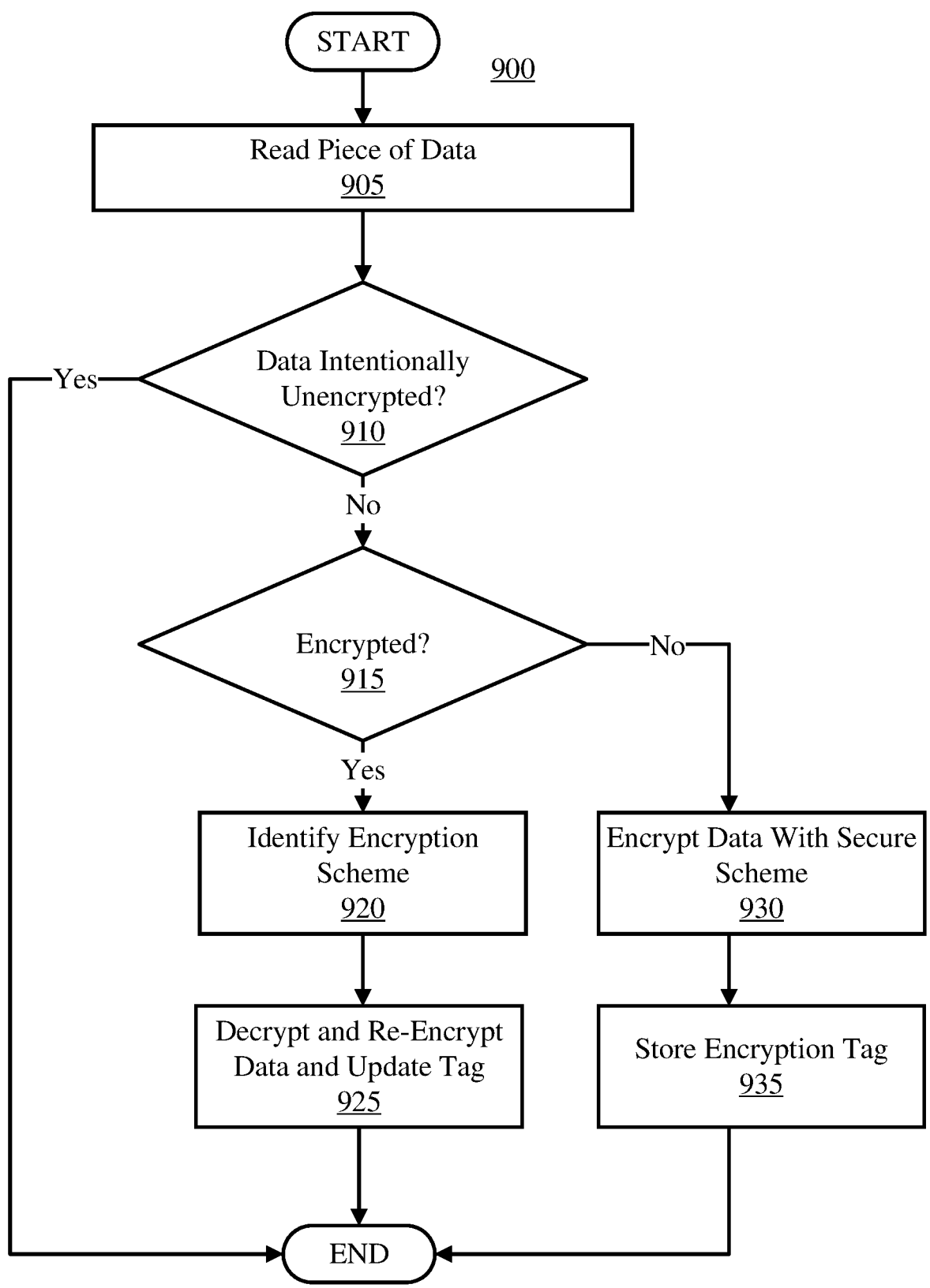
FIG. 9 is a flow-diagram illustrating an example method for encryption management, in accordance with embodiments of the present disclosure.

Referring now to FIG. 9, shown is a flow-diagram of an example method 900 for encryption management, in accordance with embodiments of the present disclosure.

Method 900 initiates at operation 905, where a piece of data is read. A determination is then made whether the data is intentionally unencrypted. This is illustrated at operation 910. If the data is intentionally unencrypted ("Yes" at operation 910), then method 900 ends, as the data does not require security measures.

If the data is not intentionally unencrypted, then a determination is made whether the data is encrypted. This is illustrated at operation 915. If a determination is made that the data is encrypted, then an encryption scheme applied to the data is identified. This is illustrated at operation 920. The encryption scheme can be identified by referencing an encryption tag describing the encryption state of the data. The data is then decrypted and re-encrypted with a second encryption scheme and the encryption tag is updated to reflect the new encryption scheme applied to the data (e.g., the new encryption algorithm and/or key are added to the encryption tag). This is illustrated at operation 925.

If a determination is made that the data is not encrypted, then the data is encrypted with a secure encryption scheme. This is illustrated at operation 930. An encryption tag is then stored with the data. This is illustrated at operation 935. The encryption tag can be generated and stored substantially similar to method 600 of FIG. 6.

The aforementioned operations can be completed in any order and are not limited to those described. Additionally, some, all, or none of the aforementioned operations can be completed, while still remaining within the spirit and scope of the present disclosure.

Figure 10:
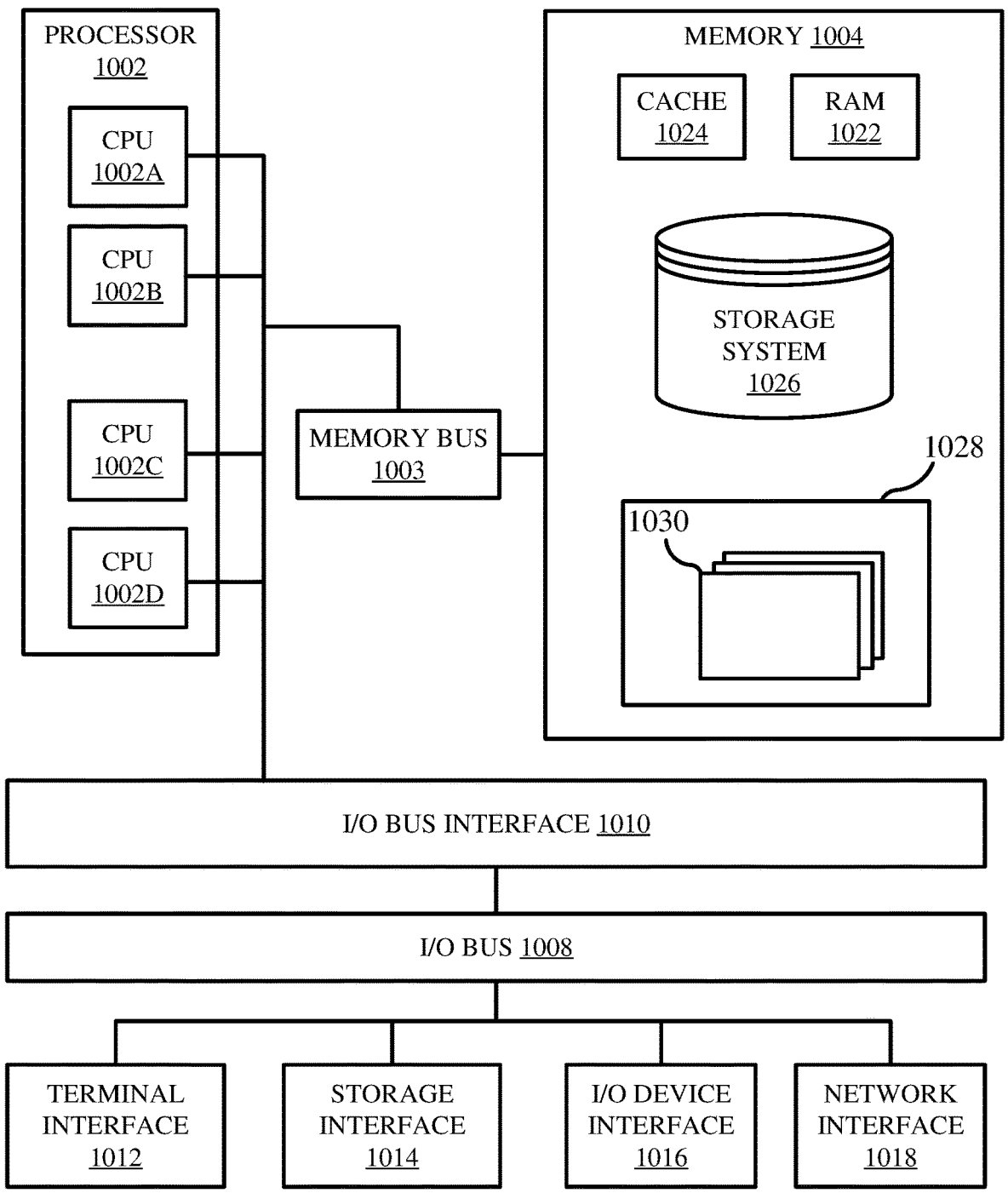
FIG. 10 is a high-level block diagram illustrating an example computer system that can be used in implementing one or more of the methods, tools, and modules, and any related functions, described herein, in accordance with embodiments of the present disclosure.

Referring now to FIG. 10, shown is a high-level block diagram of an example computer system 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1014, an I/O (Input/Output) device interface 1016, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
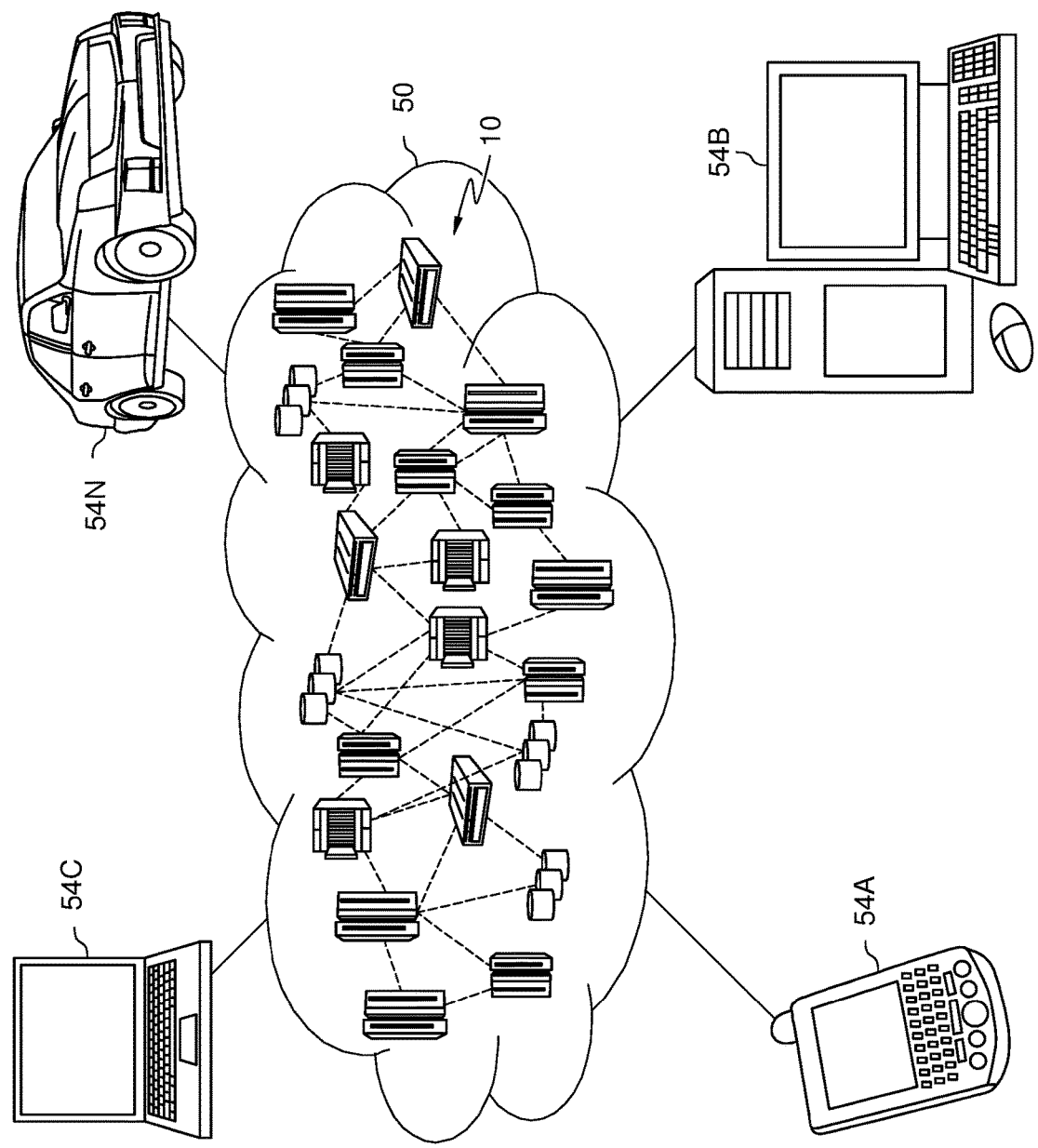
FIG. 11 is a diagram illustrating a cloud computing environment, in accordance with embodiments of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
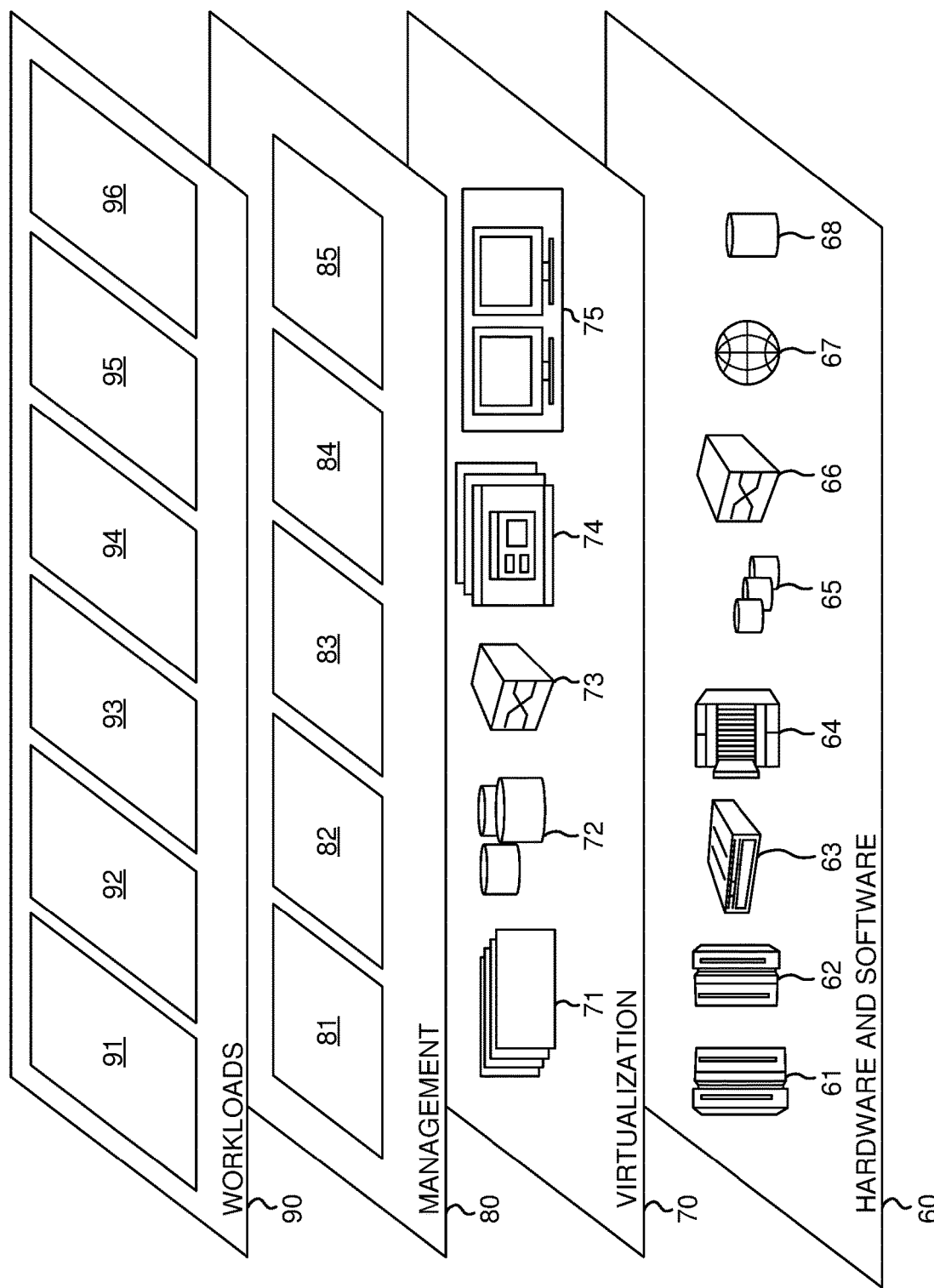
FIG. 12 is a block diagram illustrating abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption management 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Several examples will now be provided to further clarify various aspects of the present disclosure:

Example 1: A method comprising determining whether an encryption algorithm is at-risk. The method further comprises identifying, in response to determining that the encryption algorithm is at-risk, data protected by the encryption algorithm. The method further comprises executing a security action on the data protected by the encryption algorithm.

Example 2: The limitations of Example 1, wherein determining whether the encryption algorithm is at-risk includes determining a risk value for the encryption algorithm and comparing the risk value to a risk threshold.

Example 3: The limitations of any of Examples 1-2, wherein data protected by the encryption algorithm is identified using a look-up table, wherein the look-up table maps time periods to encryption algorithms, wherein all data associated with a first time-frame mapped to the encryption algorithm is identified.

Example 4: The limitations of any of Examples 1-3, wherein data protected by the encryption algorithm is identified using a look-up table, wherein the look-up table maps encryption algorithms to data locations, wherein data locations mapped to the encryption algorithm are identified.

Example 5: The limitations of any of Examples 1-4, wherein the security action includes decrypting the data protected by the encryption algorithm and encrypting the data with a second encryption algorithm.

Example 6: The limitations of any of Examples 1-5, wherein the security action includes disconnecting the data from at least one network.

Example 7: The limitations of any of Examples 1-4 or Example 6, wherein the security action includes further encrypting the data protected by the encryption algorithm with a second encryption algorithm without decrypting the data.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

Example 10: A method comprising storing an encryption tag with a data set, the encryption tag including an encryption algorithm indicator specifying an encryption algorithm used to encrypt the data set. The method further comprises determining that the encryption algorithm used to encrypt the data set is at-risk. The method further comprises locating the data set using the encryption tag. The method further comprises executing a security action on the data set.

Example 11: The limitations of Example 10, wherein executing the security action includes decrypting the data set and encrypting the data set with a second encryption algorithm.

Example 12: The limitations of Examples 10 or 11, wherein the encryption tag is updated such that the encryption algorithm indicator specifies that the data set is now protected by the second encryption algorithm.

Example 13: A system comprising one or more processor and one or more computer-readable storage media collectively storing program instructions which, when executed by the processor, are configured to cause the processor to perform a method according to any of Examples 10-12.

What is claimed is:

1. A method comprising:
    determining whether an encryption algorithm is at-risk, wherein determining whether the encryption algorithm is at-risk further comprises:
        parsing text resources for the encryption algorithm;
        identifying a first string within the text resources associated with the encryption algorithm; and
        classifying risk of the encryption algorithm based on the identified first string;
    identifying, in response to determining that the encryption algorithm is at-risk, data protected by the encryption algorithm, wherein the data protected by the encryption algorithm is identified using a look-up table, wherein the look-up table maps at least the encryption algorithm to a first time-frame and a second encryption algorithm to a second time-frame, wherein data associated with the first time-frame mapped to the encryption algorithm is identified; and
    executing a security action on the data protected by the encryption algorithm.

2. The method of claim 1, wherein determining whether the encryption algorithm is at-risk includes:
    determining a risk value for the encryption algorithm; and
    comparing the risk value to a risk threshold.

3. The method of claim 1, wherein the look-up table further maps encryption algorithms to data locations, wherein the look-up table maps at least the encryption algorithm to a first data location and the second encryption algorithm to a second data location, wherein the first data location mapped to the encryption algorithm is identified.

4. The method of claim 1, wherein the security action includes decrypting the data protected by the encryption algorithm and encrypting the data with the second encryption algorithm.

5. The method of claim 1, wherein the security action includes disconnecting the data from at least one network.

6. The method of claim 1, wherein the security action includes further encrypting the data protected by the encryption algorithm with the second encryption algorithm without decrypting the data.

7. The method of claim 1, wherein a machine learning model classifies risk of the encryption algorithm to generate a risk level, wherein the risk level is compared to a risk threshold of the encryption algorithm to determine that the encryption algorithm is at-risk.

8. A system comprising:
    one or more processors; and
    one or more computer-readable storage media collectively storing program instructions which, when executed by the one or more processors, are configured to cause the one or more processor to perform a method comprising:
        determining whether an encryption algorithm is at-risk, wherein determining whether the encryption algorithm is at-risk further comprises:
            parsing text resources for the encryption algorithm;
            identifying a first string within the text resources associated with the encryption algorithm; and
            classifying risk of the encryption algorithm based on the identified first string;
        identifying, in response to determining that the encryption algorithm is at-risk, data protected by the encryption algorithm, wherein the data protected by the encryption algorithm is identified using a look-up table, wherein the look-up table maps at least the encryption algorithm to a first time-frame and a second encryption algorithm to a second time-frame, wherein data associated with the first time-frame mapped to the encryption algorithm is identified; and executing a security action on the data protected by the encryption algorithm.

9. The system of claim 8, wherein determining whether the encryption algorithm is at-risk includes:
determining a risk value for the encryption algorithm; and
comparing the risk value to a risk threshold.

10. The system of claim 8, wherein the look-up table further maps encryption algorithms to data locations, wherein the look-up table maps at least the encryption algorithm to a first data location and the second encryption algorithm to a second data location, wherein the first data location mapped to the encryption algorithm is identified.

11. The system of claim 8, wherein the security action includes decrypting the data protected by the encryption algorithm and encrypting the data with the second encryption algorithm.

12. The system of claim 8, wherein the security action includes disconnecting the data from at least one network.

13. The system of claim 8, wherein the security action includes further encrypting the data protected by the encryption algorithm with the second encryption algorithm without decrypting the data.

14. A computer program product comprising one or more computer readable storage media, and program instructions collectively stored on the one or more computer readable storage media, the program instructions comprising instructions configured to cause one or more processors to perform a method comprising:
determining whether an encryption algorithm is at-risk, wherein determining whether the encryption algorithm is at-risk further comprises:
parsing text resources for the encryption algorithm;
identifying a first string within the text resources associated with the encryption algorithm; and
classifying risk of the encryption algorithm based on the identified first string;
identifying, in response to determining that the encryption algorithm is at-risk, data protected by the encryption algorithm, wherein the data protected by the encryption algorithm is identified using a look-up table, wherein the look-up table maps at least the encryption algorithm to a first time-frame and a second encryption algorithm to a second time-frame, wherein data associated with the first time-frame mapped to the encryption algorithm is identified; and
executing a security action on the data protected by the encryption algorithm.

15. The computer program product of claim 14, wherein determining whether the encryption algorithm is at-risk includes:
determining a risk value for the encryption algorithm; and
comparing the risk value to a risk threshold.

16. The computer program product of claim 14, wherein the look-up table further maps encryption algorithms to data locations, wherein the look-up table maps at least the encryption algorithm to a first data location and the second encryption algorithm to a second data location, wherein the first data location mapped to the encryption algorithm is identified.

17. The computer program product of claim 14, wherein the security action includes decrypting the data protected by the encryption algorithm and encrypting the data with the second encryption algorithm.

18. A method comprising:
storing an encryption tag with a data set, the encryption tag including an encryption algorithm indicator specifying an encryption algorithm used to encrypt the data set;
determining that the encryption algorithm used to encrypt the data set is at-risk, wherein determining whether the encryption algorithm is at-risk further comprises:
parsing text resources for the encryption algorithm;
identifying a first string within the text resources associated with the encryption algorithm; and
classifying risk of the encryption algorithm based on the identified first string;
locating the data set using the encryption tag, wherein a look-up table maps at least the encryption algorithm to a first time-frame and a second encryption algorithm to a second time-frame, wherein the encryption tag specifying the encryption algorithm is referenced against the look-up table to locate the data set associated with the first time-frame; and
executing a security action on the data set.

19. The method of claim 18, wherein executing the security action includes decrypting the data set and encrypting the data set with the second encryption algorithm.

20. The method of claim 19, wherein the encryption tag is updated such that the encryption algorithm indicator specifies that the data set is now protected by the second encryption algorithm.

21. A system comprising:
one or more processors; and
one or more computer-readable storage media collectively storing program instructions which, when executed by the one or more processors, are configured to cause the one or more processor to perform a method comprising:
storing an encryption tag with a data set, the encryption tag including an encryption algorithm indicator specifying an encryption algorithm used to encrypt the data set;
determining that the encryption algorithm used to encrypt the data set is at-risk, wherein determining whether the encryption algorithm is at-risk further comprises:
parsing text resources for the encryption algorithm;
identifying a first string within the text resources associated with the encryption algorithm; and
classifying risk of the encryption algorithm based on the identified first string;
locating the data set using the encryption tag, wherein a look-up table maps at least the encryption algorithm to a first time-frame and a second encryption algorithm to a second time-frame, wherein the encryption tag specifying the encryption algorithm is referenced against the look-up table to locate the data set associated with the first time-frame; and
executing a security action on the data set.

22. The system of claim 21, wherein executing the security action includes decrypting the data set and encrypting the data set with the second encryption algorithm.

23. The system of claim 22, wherein the encryption tag is updated such that the encryption algorithm indicator specifies that the data set is now protected by the second encryption algorithm.

\* \* \* \* \*